US009032371B2

(12) United States Patent
Hansson

(10) Patent No.: US 9,032,371 B2
(45) Date of Patent: May 12, 2015

(54) METHOD AND APPARATUS FOR AUTOMATIC DIAGNOSIS OF SOFTWARE FAILURES

(75) Inventor: Daniel Hansson, Lund (SE)

(73) Assignee: Verifyter AB, Lund (SE)

( * ) Notice: Subject to any disclaimer, the term of this patent is extended or adjusted under 35 U.S.C. 154(b) by 234 days.

(21) Appl. No.: 13/988,596

(22) PCT Filed: Nov. 17, 2011

(86) PCT No.: PCT/EP2011/070379
§ 371 (c)(1),
(2), (4) Date: Sep. 10, 2013

(87) PCT Pub. No.: WO2012/066091
PCT Pub. Date: May 24, 2012

(65) Prior Publication Data
US 2014/0013307 A1    Jan. 9, 2014

Related U.S. Application Data

(60) Provisional application No. 61/415,845, filed on Nov. 21, 2010.

(51) Int. Cl.
*G06F 9/44* (2006.01)
*G06F 11/00* (2006.01)
(Continued)

(52) U.S. Cl.
CPC .......... *G06F 11/3692* (2013.01); *G06F 11/079* (2013.01); *G06F 11/3604* (2013.01);
(Continued)

(58) Field of Classification Search
CPC ..... G06F 11/079; G06F 11/36; G06F 11/362; G06F 11/3612; G06F 11/3664; G06F 11/3668; G06F 11/3672; G06F 11/3688; G06F 11/3692
See application file for complete search history.

(56) References Cited

U.S. PATENT DOCUMENTS 5,671,351 A * 9/1997 Wild et al. ................. 714/38.13
6,304,982 B1  10/2001 Mongan et al.
(Continued)

OTHER PUBLICATIONS

C.E. Hymowitz et al.; New Techniques for Failure Analysis and Test Program Design; 1998; retrieved online on Mar. 5, 2015; pp. 1-10; Retrieved from the Internet: <URL: http://www.intusoft.com/td/itc98.pdf>.*
(Continued)

*Primary Examiner* — Thuy Dao
*Assistant Examiner* — Hanh T Bui
(74) *Attorney, Agent, or Firm* — Wolf, Greenfield & Sacks, P.C.; Randy J. Pritzker

(57) ABSTRACT

One embodiment of the present invention provides a technique for automatic diagnosis of regression test failures. Initially, an automatic regression test system provides the test results per configuration for a revision of the device under test. Next, each failing test is analyzed in conjunction with the information in the version control system that is used to manage the device under test in order to conclude what additional revisions that needs to be tested for each test and configuration in order to find the earliest failing revision. Next, a request is issued to the automated regression test system which performs the requested tests and provides back a list of test results. Next, another analysis takes places and if the earliest failing revision cannot be concluded for each failing test and configuration then another request is issues to the automated regression test system. This continues until the earliest failing revision can be concluded for each failing test and configuration. The result presents each faulty revision and the group of tests and configurations that fail as a consequence. Another embodiment of the present invention provides a technique for automatically diagnosing the root cause for a test failure by comparing the difference in outcome between one revision of the device under test that fails with another revision of the same test for which the same test passes. This is done by instrumenting the computer program that constitutes the device under test to extract the variable states that affect the difference in outcome. Next, all parts of the computer program that are proven to have no affect on the difference in outcome is ignored. Finally, the root cause is concluded by identifying the sections of the computer program that are different between the revision for which the test fails and the revision for which test passes. The parts of these sections that have also been proven to be affecting the difference in outcome are concluded to be the root cause.

3 Claims, 17 Drawing Sheets

(51) Int. Cl.
*G06F 11/36* (2006.01)
*G06F 11/07* (2006.01)

(52) U.S. Cl.
CPC ......... *G06F11/3664* (2013.01); *G06F 11/3668* (2013.01); *G06F 11/366* (2013.01); *G06F 11/3688* (2013.01); *G06F 11/3672* (2013.01)

(56) References Cited

U.S. PATENT DOCUMENTS

| | | | | |
|---|---|---|---|---|
| 7,647,528 | B2* | 1/2010 | Yilmaz et al. | 714/38.1 |
| 7,836,346 | B1* | 11/2010 | Davidov et al. | 714/38.1 |
| 8,479,165 | B1* | 7/2013 | Kawashima et al. | 717/124 |
| 8,707,268 | B2* | 4/2014 | Kawashima et al. | 717/124 |
| 8,745,588 | B2* | 6/2014 | Kawashima et al. | 717/124 |
| 8,813,033 | B2* | 8/2014 | Sreedhar | 717/124 |
| 8,881,109 | B1* | 11/2014 | Bridges, Sr. et al. | 714/38.1 |
| 8,935,676 | B2* | 1/2015 | Verbest | 717/124 |
| 2005/0223357 | A1 | 10/2005 | Banerjee et al. | |
| 2005/0235263 | A1* | 10/2005 | Bundy et al. | 717/124 |
| 2006/0107121 | A1* | 5/2006 | Mendrala et al. | 714/38 |
| 2006/0294434 | A1* | 12/2006 | Ikeda et al. | 714/38 |
| 2007/0006041 | A1 | 1/2007 | Brunswig et al. | |
| 2007/0016894 | A1* | 1/2007 | Sreedhar | 717/131 |
| 2008/0120602 | A1* | 5/2008 | Comstock et al. | 717/124 |
| 2009/0328002 | A1* | 12/2009 | Lin et al. | 717/124 |
| 2011/0016356 | A1* | 1/2011 | Artzi et al. | 714/38 |
| 2011/0145653 | A1* | 6/2011 | Broadfoot et al. | 714/38.1 |
| 2013/0275949 | A1* | 10/2013 | Kawashima et al. | 717/124 |
| 2014/0157036 | A1* | 6/2014 | Walton et al. | 714/2 |
| 2015/0039941 | A1* | 2/2015 | Kalyanasundram | 714/38.1 |

OTHER PUBLICATIONS

ChangHai Nie and Hareton Leung; The Minimal Failure-Causing Schema of Combinatorial Testing; ACM; Sep. 2011; retrieved online on Mar. 5, 2015; pp. 1-38; Retrieved from the Internet: <URL: http://delivery.acm.org/10.1145/2010000/2000801/a15-nie.pdf?>.*

Larry Kirkland et al.; Evaluating Go-Path Measurements to Determine Faulty Components "The Skill of the Test is the Software"; IEEE; 2004; retrieved online on Mar. 5, 2015; pp. 338-343; Retrieved from the Internet: <URL: http://ieeexplore.ieee.org/stamp/stamp.jsp?tp=&arnumber=1436872>.*

International Search Report for parent application PCT/EP2011/070379, dated Feb. 13, 2013, pp. 1-3.

* cited by examiner

FIG 6.

| Global Revision No 606 | File 1 – Version No 607 | File 2 – Version No 608 | File 3 – Version No 609 | Checkin Time 610 | Reference |
|---|---|---|---|---|---|
| 5 | 1.3 | 1.1 | 1.5 | 26 Nov | 601 |
| 4 | 1.3 | 1.0 | 1.5 | 25 Nov | 602 |
| 3 | 1.2 | 1.0 | 1.5 | 24 Nov | 603 |
| 2 | 1.1 | 1.0 | 1.5 | 23 Nov | 604 |
| 1 | 1.1 | 1.0 | 1.4 | 22 Nov | 605 |

FIG 7.

| Global Revision No | Test Result | Reference |
|---|---|---|
| 5 | Fail | 701 |
| 4 | Fail | 702 |
| 3 | Fail | 703 |
| 2 | Pass | 704 |
| 1 | Pass | 705 |

FIG 8.

| Global Revision No | Test Results | Reference |
|---|---|---|
| 5 | Fail | 801 |
| 4 | Unknown | 802 |
| 3 | Unknown | 803 |
| 2 | Unknown | 804 |
| 1 | Unknown | 805 |

FIG 9.

| Global Revision No | Test Results | | | | Reference |
|---|---|---|---|---|---|
| | Configuration 1 907 | | Configuration 2 908 | | 901 |
| | Test 1 909 | Test 2 910 | Test 1 911 | Test 3 912 | |
| 5 | Fail | Fail | Fail | Fail | 902 |
| 4 | Fail | Unkown | Unkown | Unkown | 903 |
| 3 | Fail | Fail | Fail | Pass | 904 |
| 2 | Pass | Fail | Pass | Pass | 905 |
| 1 | Pass | Unkown | Unkown | Unkown | 906 |

METHOD AND APPARATUS FOR AUTOMATIC DIAGNOSIS OF SOFTWARE FAILURES

TECHNICAL FIELD

The present invention relates to techniques for automatic diagnosis of test failures. The device under test may be a computer program, an integrated circuit or any other system that is defined during its development phase as a computer program. This invention relates to such computer programs that are tested in an automated test system during the development phase to ensure good quality. More specifically, the present invention relates to a method and apparatus for automatically diagnosing which files, revisions and configurations of such computer programs that causes specific test failures.

Also, the present invention relates to a method and apparatus for automatically diagnosing the root cause of a test failure by comparing the tested failing revision of the computer program with another revision of the same computer program for which the test passes.

BACKGROUND OF THE INVENTION

Regression Testing

Regression testing is any type of testing that seeks to uncover software errors after changes to the program have been made, by retesting the program. The intent of regression testing is to ensure that a change, such as a bug fix or new functionality, does not introduce new bugs. Experience has shown that as software is fixed, emergence of new and/or reemergence of old faults is quite common. Therefore it is considered good practice to perform regression testing regularly during the development phase to catch any new bugs that are inadvertently introduced into the software. Regression testing is normally performed by an automated test system, which checks out the specified revision of the device under test, runs a list of tests and reports the result.

Regression testing can be performed on any type of product that is defined as software during the development phase, when regression testing is performed, but the end-product does not need to be software. For example, some hardware such as most digital integrated circuits is defined during the development phase in a hardware description language, which is a type of software. The integrated circuit becomes hardware at the end of the development phase in the fabrication plant. Consequently, from a regression testing point of view, integrated circuit development is a kind of software development during the development phase, and as such fits very well with the regression testing concept. Regression testing is as widely used in integrated circuit development as in development of software as end-products. Regression testing is not limited to integrated circuits and software, but is well suited for any type of product that is described as software during its development phase.

Regression testing is a means of maintaining quality of the software throughout the development phase. The more often regression testing is performed, the less average time between a new software bug is introduced and it is discovered. All other things the same, detecting a bug earlier means it will also be fixed earlier. Thus the more often regression testing is run then the higher average quality of the software during the development phase as more bugs will have been fixed at any given time.

As regression testing is normally performed by automated test systems it does not require much human resources to run regression testing often. However, this is not true when it comes to diagnosis of the tests that fail during regression testing. These tests must be diagnosed manually. The diagnosis can be split into two steps: 1) localization of the fault and 2) finding the root cause.

The first step, localization of the fault, is the act of trying to link a test failure to a faulty sub-unit of the device under test. This is necessary in order to be able to assign the bug report to the correct developer or group of developers. It is often performed by the same group of people who are responsible for running the regression tests. The more often regression testing is run the more test failures are produced that needs to be diagnosed.

The second step, finding the root cause, is necessary in order to fix the bug. It is preferably done by the developer who designed the faulty unit, or another engineer who is part of the same development organization. From a workload point of view, this type of diagnosis is more linked to the number of bugs that are introduced into the software than how often the regression testing is being performed.

Both types of diagnosis are time consuming and expensive in terms of human resources. The total time spent on diagnosis is an important factor that determines when product under development can be released. Also the number of available engineers for manual diagnosis puts a limit on how often regression testing can be run, which in turn may reduce the software quality during development.

Hence, what is needed is a method and apparatus for automatically diagnosing regression test failures down to the faulty units that caused the test failures, in order to be able to file the bug report to the correct developer or organization, without the need for manual diagnosis.

Also, what is needed is a method and apparatus for automatically finding the root cause of a test failure. This is needed in order make bug fixing more efficient, without the need for manual root causing.

SUMMARY OF THE INVENTION

One embodiment of the present invention provides a technique for automatic diagnosis of regression test failures. Initially, an automatic regression test system provides the test results per configuration for a revision of the device under test. Next, each failing test is analyzed in conjunction with the information in the version control system that is used to manage the device under test in order to conclude what additional revisions that needs to be tested for each test and configuration in order to find the earliest failing revision. Next, a request is issued to the automated regression test system which performs the requested tests and provides back a list of test results. Next, another analysis takes places and if the earliest failing revision cannot be concluded for each failing test and configuration then another request is issues to the automated regression test system. This continues until the earliest failing revision can be concluded for each failing test and configuration. The result presents each faulty revision and the group of tests and configurations that fail as a consequence.

In a variation of this embodiment, the test results data comes from not only the automatic regression test system, but also from a test results database, which contains test results and diagnosis conclusions from previous runs.

In a variation of this embodiment, a bug tracking system included, as well as a test results database. This allows automatic bug report updates to the bug tracking system, such as creating of new bug reports, closure of old bug reports which have been verified to have been fixed and updating open bug reports with information when it was last tested.

Another embodiment of the present invention provides a technique for fast diagnosis of groups of failing tests and configurations. First, the test and configuration is selected which is the fastest to diagnose of all tests and configurations within the same group. A group of failing tests and configurations are assumed to be failing due to the same failing faulty revision. Next this test and configuration is tested for several revisions until it can be concluded which revision is the earliest failing revision and which revision is the last passing revision. Only these two revisions are subsequently tested on all the remaining combinations of tests and configurations within the same group in order to find out, in a speedy manner, whether they are failing due to the same faulty revision.

Another embodiment of the present invention provides a technique for automatically diagnosing the root cause for a test failure by comparing the difference in outcome between one revision of the device under test that fails with another revision of the same test for which the same test passes. This is done by instrumenting the computer program that constitutes the device under test to extract the variable states that affect the difference in outcome. Next, all parts of the computer program that are proven to have no affect on the difference in outcome is ignored. Finally, the root cause is concluded by identifying the sections of the computer program that are different between the revision for which the test fails and the revision for which test passes. The parts of these sections that have also been proven to be affecting the difference in outcome are concluded to be the root cause.

BRIEF DESCRIPTION OF THE DRAWINGS

FIG. 6 presents an example of global revision numbers.

FIG. 7 presents an example of the earliest failing revision and the last passing revision.

FIG. 8 presents an example of revisions that require diagnosis.

FIG. 9 presents an example of test results for different configurations.

DETAILED DESCRIPTION OF PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

A Method and Apparatus for Automatic Diagnosis of Regression Test Failures

This invention provides a method and apparatus for automatic diagnosis of regression test failures. This invention is able to conclude the specific revision of the device under test in which a bug was inserted that caused a specific test failure. Once the faulty revision has been determined it is also possible to determine who made the update, when the update was made, what files were updated, the faulty file revision numbers and the code lines that have been modified in those files. This is the information that is required in order to be able to create and assign the bug report to the appropriate person. To summarize, the method and apparatus for automatic diagnosis of regression test failures links all test failures to the faulty revisions that contain the bugs that caused the respective test failure.

Figure 1:
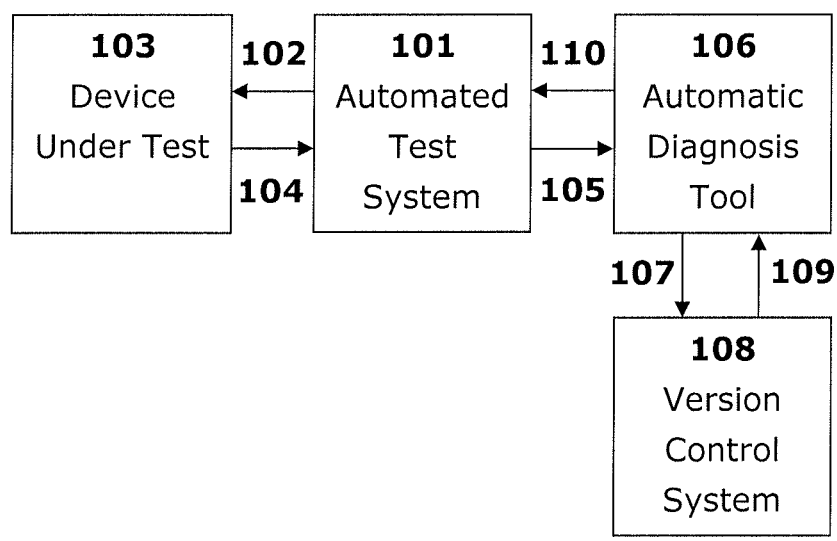
FIG. 1 illustrates the minimum system setup in accordance with an embodiment of the present invention.

FIG. 1 illustrates the minimum system setup in accordance with an embodiment of the present invention. The automatic diagnosis tool 106 is connected to both the version control system 108 and the automated test system 101. The automated test system 101 performs the regression testing on the device under test 103 and reports the test results 105 to the automatic diagnosis tool 106. The test results 105 is a list where the result of each test, marked as pass or fail, is listed for each revision and configuration of the device under test 103. The automatic diagnosis tool 106 analyzes the test result 105 and tries to conclude in which revision the error that caused a certain test failure was introduced. The automatic diagnosis tool 106 interrogates the version control system 108 in order to understand what revisions that exist. If the automatic diagnosis tool finds revisions that have not been tested for a certain test and/or configuration and those are required to be tested in order to reach a conclusion then the automatic diagnosis tool 106 presents a list of revisions-test-configuration combinations 110 that it requests the automated test system 106 to test. The automated test system 106 performs the requested tests and presents the results 105 back to the automatic diagnosis tool, which in turn performs another round of analysis. If the automatic diagnosis tool still cannot conclude the diagnosis then it will interrogate the version control system 108 again and issue a new list of revisions-test-configuration combinations 110 and request the automated test system to test them. This process is repeated until the automatic diagnosis tool 106 has been able to conclude which are the faulty revisions that have caused each respective failing test. When this point is reached then the automatic diagnosis tool 106 stops and reports the faulty revisions for all failing tests including information about who checked in the faulty revisions, when this was done, which files were updated, the revision numbers of those files and which code lines that were updated in the faulty revision of those files.

The version control system 108 consists of one or many repositories which together contain all files of the device and also all the tests that are used to test the device. The version control system 108 contains all versions of all those files. When a developer fixes a bug or introduces new functionality to the device then the developer must update the appropriate files in the version control system 108 which results in new versions of the updated files being created. The new versions of the files are checked in to the version control system 108, which means they become available to anyone reading the version control system 108.

There are many different types of version control systems. This invention works with all types. One difference between the existing types of version control systems is whether a global revision number exist for the entire repository. FIG. 6 presents an example of global revision numbers. The global revision number 606 is updated when any file in the repository is updated, which means the global revision number 606 is a revision number for the entire repository. For example in the last revision 601 the global revision number 606 was updated to 5 because file 2 (608) was updated to version 1.1. Another example is global revision number 3 (refer to 603) which was updated as a consequence of file 1 (607) was updated to version 1.2. If the version control system contains this type of global revision number then the automatic diagnosis tool will use it to conclude where the bug was inserted. If the version control system does not have a global revision number 606, and only contains file versions (refer to 607, 608, 609) then the automatic diagnosis tool will create a global revision number 606 and use it in its internal operations. When communicating to the automatic test system which global revisions of the device that should be tested, then it will translate this created global revision number 606 to something the version control system understands, e.g. the state of the repository at a specific time or a full list of all file versions requested, depending on what type of version control system that is being used. Each global revision number 606, whether created by the automatic diagnosis tool or available in the version control system, corresponds to the exact state of the repository at a specific time (refer to the check-in time 610).

The automatic diagnosis tool links each test failure to a specific global revision 606 of the device under test. Once it has diagnosed which global revision that is faulty then it checks what files versions that were updated in this global revision number 606. For example, let's say that the automatic diagnosis tool concludes that the global revision number 4 (602) contains the bug which caused a specific test to fail. By comparing to the previous global revision number 3 (603) which does not contain this bug it is possible to see exactly which files that were updated. In this example it is file 1 (607) that was updated to version 1.3 in global revision number 4. The next piece of information to extract is the information about who checked in this file version and when. This information is available for each file version in the version control system, which means the automatic diagnosis tool can simply request this information, now that it knows the erroneous file version number. In version control system which has the concept of a global revision number it is possible to extract this information without knowing what files that were updated as the global revision number refers to the entire repository. The final step, to check what code lines that were updated in the faulty file versions is done by comparing the faulty file versions with the previous versions of the same files.

This invention concludes in which global revision a bug was introduced by finding the earliest global revision for which a specific test fails. FIG. 7 presents an example of the earliest failing global revision and the last passing global revision. The last time a specific test was run on this device, i.e. global revision no 5 (701), the test failed. By testing previous global revisions of the device the invention can conclude that the fault was first introduced in global revision no 3 (703). The following criteria must be fulfilled in order to reach a conclusive diagnosis:

1. The test must fail on the latest tested global revision 701 of the device under test. Otherwise there is no fault to diagnose.
2. The test must have passed on an earlier global revision 704, 705.
3. All global revisions between the last global revision for which the test passes 704 and the last global revision that was tested 701 must fail If the test has never passed for any global revision then the invention will conclude that the test has never passed. This means the error was not introduced in a certain revision, but that the device and/or the test has not yet been implemented in a correct manner. This is also useful information to conclude, but in this circumstance it will not be possible to pinpoint automatically the person that caused the fault as the device has never worked for this specific test. For regression testing this scenario should not occur often. The purpose of regression testing is to retest a working device in order to ensure that new bugs are not inadvertently introduced. Thus regression testing occurs on a reasonably stable version of the device where each test normally has passed on some global revision of the device at some point on time, which is enough for this invention to be able to make a conclusive diagnosis.

If the earliest failing global revision 703 has a different error message than the last tested global revision 701 then the invention will report this as this may indicate that the nature of the bug has changed or that the first bug has been fixed, but a new bug inadvertently introduced. However, the earliest failing global revision 703 is still the revision which is the cause of the failing test because it is since this global revision that the specific test has been failing. The subsequent global revisions 701, 702 may have altered the bug or fixed the bug and introduced a new bug, but the developer who first caused the test to fail must make this analysis. Thus the conclusion of the diagnosis will still be the same, i.e. the earliest failing global revision is still 3 (703), but the test results including the error messages of the subsequent global revision 701, 702 will be added to the diagnosis report in order to give a full picture.

Figure 4:
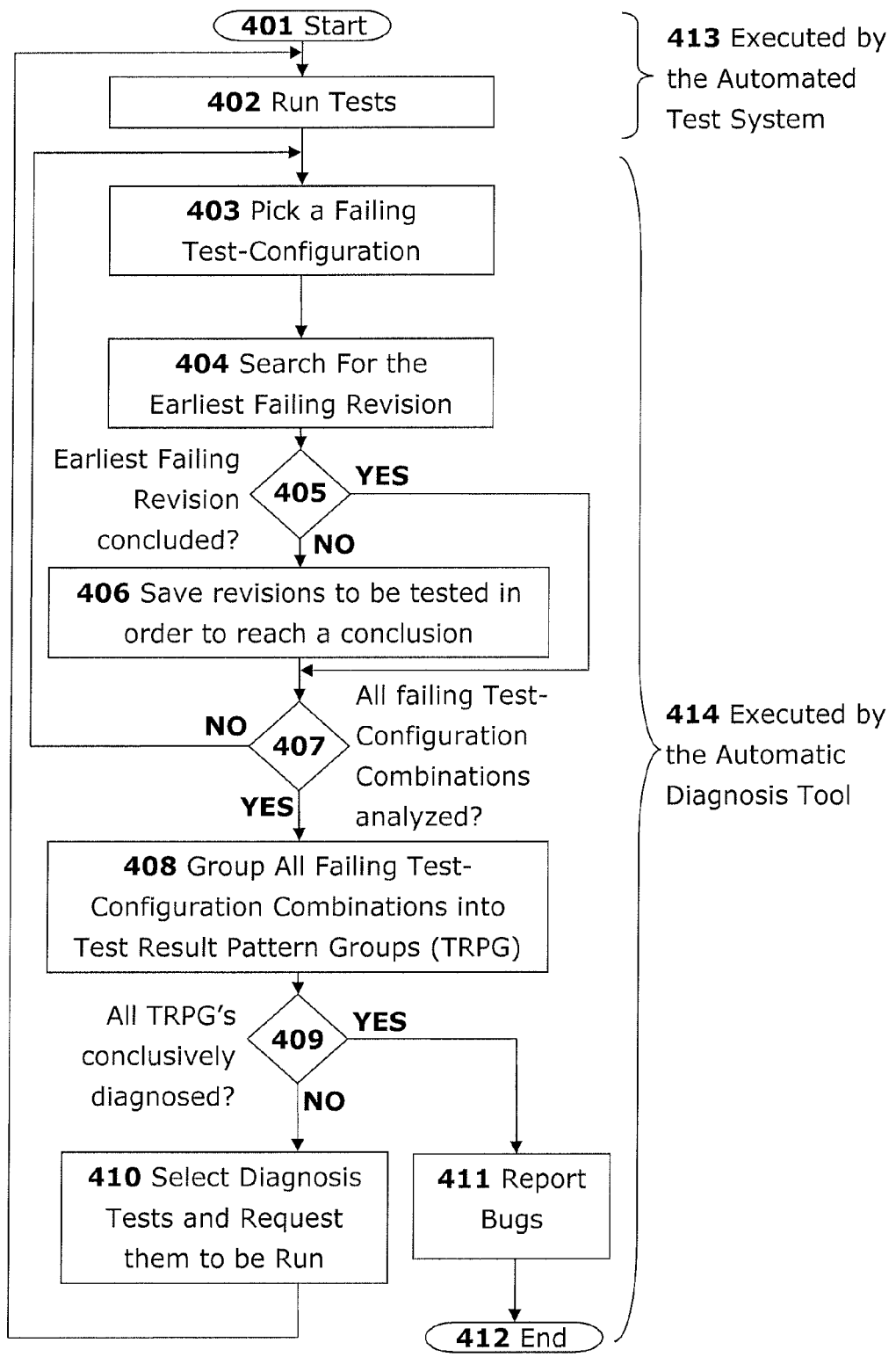
FIG. 4 presents a flow chart of the automatic diagnosis process of regression test failures for a minimum system setup in accordance with an embodiment of the present invention.

FIG. 4 presents a flow chart of the automatic diagnosis process of regression test failures for a minimum system setup in accordance with an embodiment of the present invention. The diagnosis process starts when the automated test system is started 401 by an external entity such as a verification engineer or another computer program. The automated test system runs a list of regression tests 402 and reports the result. This first phase 413 is executed entirely by the automated test system, with no involvement from the automatic diagnosis tool. Thereafter the automated test system calls the automatic diagnosis tool. The rest of the diagnosis process is controlled by the automatic diagnosis tool 414.

The automatic diagnosis tool starts by picking one of the test-configuration combinations that failed in the regression test 403. A test-configuration combination is a test that was for a certain configuration of the device under test. FIG. 9 presents an example of test results for different configurations. Two configurations of the device under test have been tested: configuration 1 (907) and configuration 2 (908). On configuration 1 (907) two tests were run: test 1 (909) and test 2 (910). On configuration 2 (908) two tests were also run: test 1 (911) and test 3 (912). Note that test 1 (909, 911) were run on both configurations. In total FIG. 9. presents the following 4 test-configuration combinations:

1. Configuration 1-Test 1
2. Configuration 1-Test 2
3. Configuration 2-Test 1
4. Configuration 3-Test 3

All these 4 test-configuration combinations are failing on global revision no 5 (901). The significance of a test-configuration combination is that the test result for one test-configuration combination cannot be assumed to be the same for any other test-configuration combination that has not yet been tested, because either the test or the configuration of the device is different. Consequently each test-configuration needs to be analyzed and tested separately. The invention may predict that a test result for one test-configuration will be the same for another test-configuration, but this can only be concluded by verifying that this is the case. The invention always verifies each test-configuration combination independently of the other test-configuration combinations.

Next step in the diagnosis process (refer to FIG. 4) is to search for the earliest failing revision 404 for the selected test-configuration combination. An example of this is presented in FIG. 7, which was earlier explained. In this example the earliest failing revision is global revision number 3 (703). The next step 405 is to check whether the earliest failing revision was concluded. In the example present in FIG. 7, the answer is yes. FIG. 8 presents an example of revisions that require diagnosis, because the earliest failing revision could not be concluded. This is because the global revisions 4, 3, 2 and 1 (refer to 802-805) have not been tested. If this is the case then the invention will save the revisions that needs to be tested in order to reach a conclusion 406 in FIG. 4, which in FIG. 8 means global revision number 4, 3, 2 and 1 (refer to 802-805). These revision numbers will be stored in a list as required to be tested in order to reach a conclusion for this specific diagnosis, but whether the invention will actually request the automated tests system to run these tests will not be decided until step 410.

The maximum test bandwidth is a user-defined variable which is set according to how many tests that can be run in parallel by the automated tests system. If the maximum test bandwidth is set to 2, then only two global revision numbers would be selected to test for a specific test-configuration combination that cannot be conclusively diagnosed. In the example in FIG. 8 this means only global revision number 4 (802) and 3 (803) would be saved as revisions required to be tested in order to reach a conclusion in step 406 in FIG. 4.

In step 407 in FIG. 4 the invention checks whether all failing test-configuration combination have been analyzed. If no, then it picks the next failing test-configuration combination and analyzes in the same way as just explained. When all failing test-configuration combinations have been analyzed the invention proceeds to step 408 where all failing test-configuration combinations are grouped into Test Result Pattern Groups.

A Test Result Pattern Group (TRPG) consists of one or many failing test-configuration combinations, which all share the same test result patterns and consequently are all failing due to the same bug. If all test-configuration combinations have been conclusively diagnosed, i.e. the earliest failing global revision has been identified for each test-configuration combination then all test-configuration combinations should be grouped in the same TRPG if they share the same earliest failing global revision. If this is the case then it is proven that all the test-configuration combinations are failing since the fault was introduced in the earliest failing global revision that is common for all failing test-configuration combinations in the TRPG. When all test-configurations have been conclusively diagnosed and grouped into TRPG's then at step 409 the answer is yes—all TRPG's are conclusively diagnosed. The following step 411 is to report all bugs, where one bug is one TRPG, and then the end of the diagnosis process 412 has been reached.

However at an earlier stage in the diagnosis process not all test-configuration combinations have been conclusively diagnosed. Consequently the grouping in 408 cannot rely on the earliest failing global revisions of the test-configuration combinations alone as this is not yet concluded for at least one of the test-configuration combinations. In this case, the grouping into TRPG's in 408 instead tries to group test-configuration combinations into the TRPG's that are most likely to be due to the same bug. The following aspects are taken into account:

1. All test results of non-conclusive test-configuration combinations are compared to the sub-set of test-configurations that have been conclusively diagnosed. If a test-result of the non-conclusive test-configuration combination is contradictory to the test result of the last passing global revision of the conclusive test-configuration combination then the non-conclusive test-configuration combination and the conclusive test-configuration are put in different TRPG's as they cannot be due to the same cause. On the other hand, if the these test results are not contradictory then the test-configuration combinations are grouped together as there is a high probability that these test-configuration combinations are due to the same bug.
2. The same is the case if the non-conclusive test-configuration combination has a contradictory test result to the test result of the earliest failing global revision of the conclusive test-configuration combination or any of its subsequent global revisions. Again these test-configuration combinations would be put in different TRPG's as they cannot be due to the same cause. If the test result is not contradictory on the other hand then the test-configuration combinations will be put in the same TRPG.
3. The invention tries to create as few TRPG's as possible as it is more likely that few bugs caused many test failures than that many different bugs caused many test failures. The experience is that one bug on average causes more than one test to fail.
4. The invention tries to group test-configuration combinations together that shares a test or a configuration. One failing test is likely to fail on more than one specific configuration. Similarly one faulty configuration is likely to cause more than one test to fail.
5. The invention compares the error messages, error numbers and log files from the different test-configuration combinations and group them together in the same TRPG if the similarities are strong If all the TRPG's are not conclusively diagnosed in step 409 then the invention selects a number of revisions for a number of test-configurations that it wishes to have tested in step 410. These combinations of revision, test and configuration are referred to as diagnosis tests, which the invention requests the automated test system to test. The automated test system runs the requested diagnosis tests 402 and then the diagnosis process starts another iteration. This process continues until all TRPG's have been conclusively diagnosed 409, after which the bugs are reported 411 and the process stops 412.

The number of diagnosis tests that are selected in step 410 depends on the user-defined variable maximum test bandwidth. For example if it is set to 10 then 10 diagnosis tests will be selected. As the maximum test bandwidth constitutes a limit on how many diagnosis tests that can be run that means only a subset of all the required diagnosis tests can be run in each iteration between 402 and 410 of the flow chart in FIG. 4. Consequently there is a process of selecting the most important subset of all the diagnosis tests that were saved in step 406. The maximum test bandwidth limit is not the only reason for selecting a subset of all the diagnosis tests. There is also the desire to be able to reach a fully conclusive diagnosis as fast as possible to save computer resources and make the diagnosis faster.

One embodiment of such a diagnosis test selection process is to select one pilot per TRPG. A pilot is the failing test-configuration combination which is deemed to be the fastest to use to conclude the earliest failing global revision, which should be the same for the entire TRPG, provided the grouping was correctly made. Factors that contribute to the selection as a pilot is a test that is fast to run, especially on the configuration in question, and where the number of remaining revisions to test is fewer that the other test-configuration combinations in the same TRPG. One pilot per group is selected in this manner with the highest priority. All the revisions for the test-configurations that have been selected as pilots are requested as diagnosis tests 410 and run by the automated test system 402 upon which a new iteration of the diagnosis process starts 403.

Once a pilot has been conclusively diagnosed the next step is to test whether the other test-configurations in the same TRPG also contain the same bug, and have thus been grouped correctly. This is done by only testing 2 revisions per test-configuration combination: the earliest failing global revision of the pilot and the last passing global revision of the pilot. If any of these revisions will results in a contradictory test result then the grouping was incorrect and consequently the grouping will be adjusted in the next diagnosis iteration process when step 408 is reached again. On the other hand, if the test results is not contradictory then it has been conclusively proven that the same bug affected the other test-configuration as well and this with only 2 revisions tested for this test-configuration combination.

FIG. 9 presents an example of test results for different configurations. The test-configuration combination test 1 (909)-configuration 1 (907) has in this example been selected as pilot and conclusively diagnosed. The earliest failing global revision for the pilot is global revision 3 (904). As a consequence of this diagnosis the earliest failing global revision 3 (904) and the last passing global revision 2 (905) of the pilot have been tested on all the other test-configuration combinations in the same TRPG. The only test-configuration combination that does not have contradictory test results is configuration 2 (908)-test 1 (911), which conclusively can be diagnosed to suffer from the same bug as the pilot. The other test-configurations are incorrectly grouped and will be grouped in other TRPG's in step 408 in FIG. 4 in the next iteration of the diagnosis process.

In FIG. 9 both the test-configuration test 1 (909)-configuration 1 (907) and the test-configuration configuration 2 (908)-test 1 (911) have been conclusively diagnosed to have been failing due to the bug that was inserted in the earliest failing global revision no 3. The test-configuration test 1 (909)-configuration 1 (907) have been conclusively diagnosed to still suffer from this bug whereas there is a small probability that this bug have been fixed for the test-configuration configuration 2 (908)-test 1 (911), without fixing the problem for the other test-configuration, but then had a new bug inserted which is the new reason for this test-configuration combination failing. The probability of fixing a bug for just one test-configuration and then subsequently introducing a new bug again without affecting the other test configurations in a measurable way is very unlikely, but the risk still exists. In FIG. 9 global revision 4 (903) of test-configuration configuration 2 (908)-test 1 (911) has not been tested and there is a chance, albeit low, that this test result will be a pass, in which case the previous bug has been fix but subsequently in the next global revision 5 (902) a new bug is inserted. The user can decide how to handle this by setting a user defined variable. Either the user puts highest priority on a fast diagnosis, but does not care if all subsequent bugs are caught as in most cases there will not be any subsequent bugs to discover. Alternatively, the user puts highest priority on a fully conclusive diagnosis of all test-configuration combinations, in which case the automatic diagnosis tool will continue and test all revisions between the earliest failing global revision and the last tested revision for each test-configuration combination.

Figure 2:
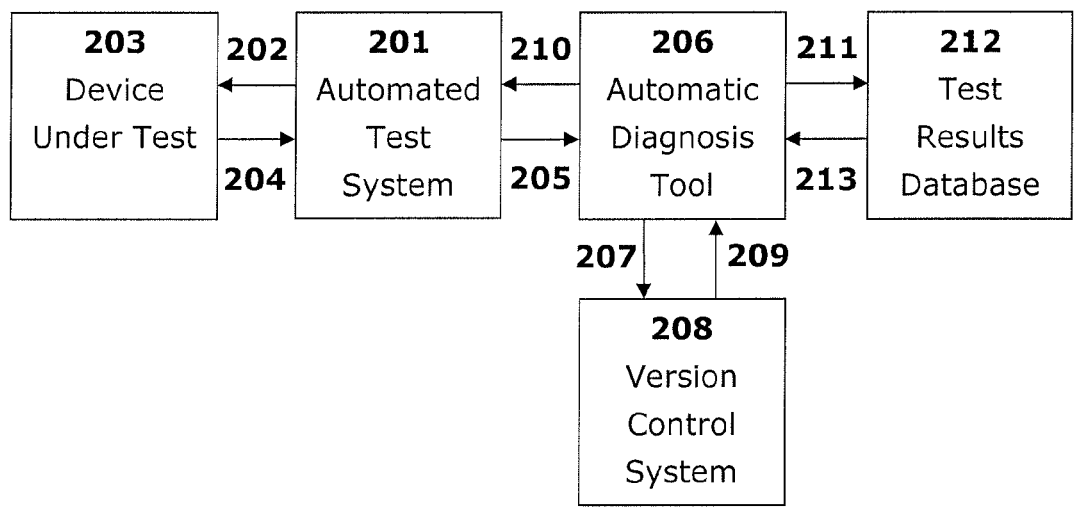
FIG. 2 illustrates a system setup with a test results database in accordance with an embodiment of the present invention.

A Method and Apparatus for Automatic Diagnosis of Regression Test Failures with a Test Results Database Another embodiment of the present invention is to add a test results database. The test results database stores all tests results and all previous diagnosis conclusions, such as open and closed bugs. FIG. 2 illustrates a system setup with a test results database 212 in accordance with an embodiment of the present invention. The only difference between this embodiment of the invention and the embodiment described in FIG. 1 is the test results database 212 in FIG. 2.

One advantage of the test results database is to reduce the amount of time and computer resources required to make the diagnosis. The same diagnosis test does not have to be retested if its result is already available in the test results database. In the same way, an open bug that is still open does not have to be diagnosed from scratch as the old diagnosis information can be read from the results database. The second advantage of the result database is that it is possible to keep track of open and closed bugs. This embodiment of the invention can report at any given time that current open bugs. It can also not when a previously open bug has been closed as it no longer exists in the latest tested global revision. It is be possible to show a report of how bugs were opened and closed over time, which is useful in order to predict how far away the release is.

Figure 5:
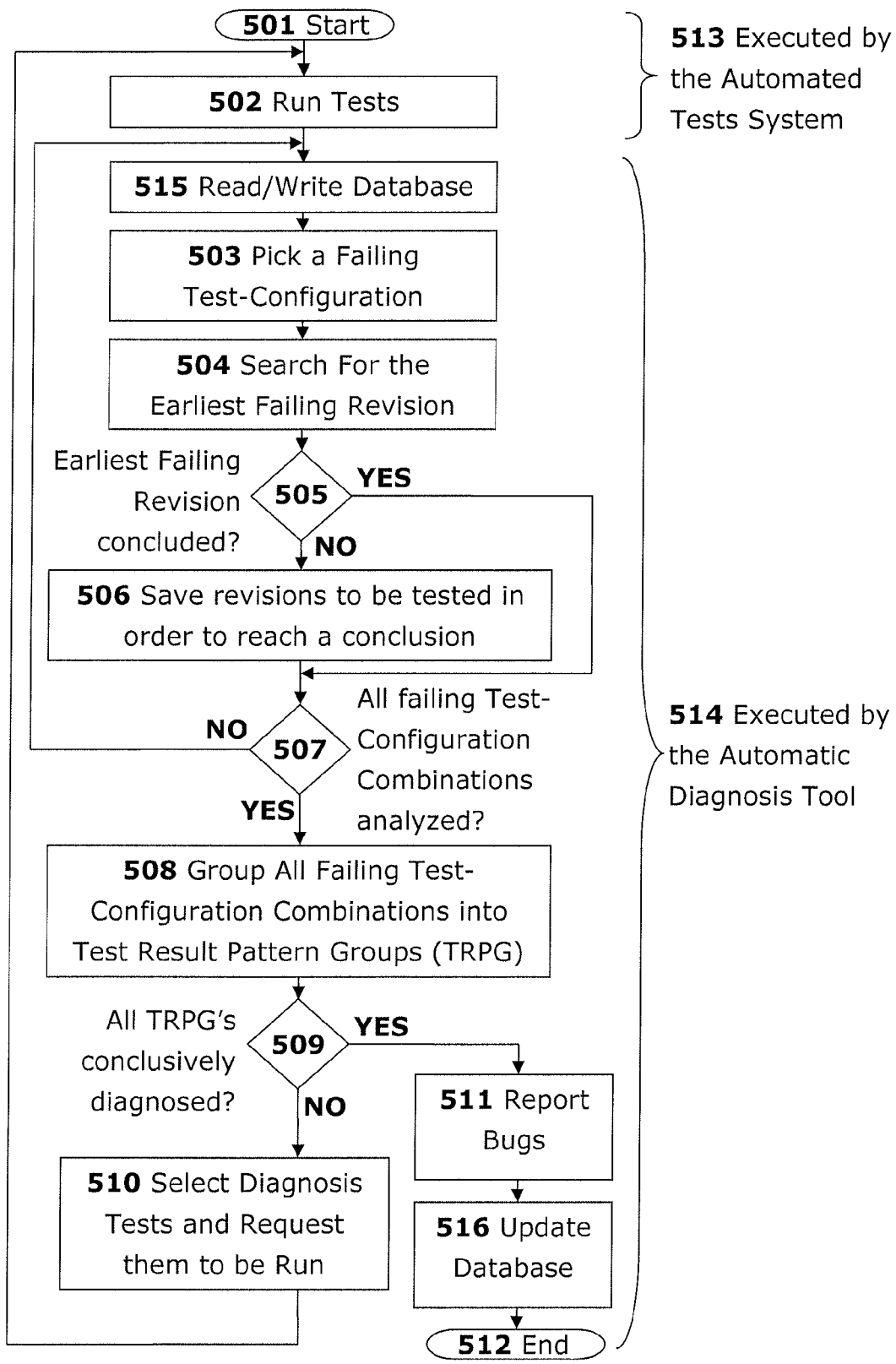
FIG. 5 presents a flow chart of the automatic diagnosis process of regression test failures for a system with a test results database in accordance with an embodiment of the present invention.

FIG. 5 presents a flow chart of the automatic diagnosis process of regression test failures for a system with a test results database in accordance with an embodiment of the present invention. The only difference between this embodiment and the embodiment described earlier in FIG. 4 which does not have a test results database are steps 515 and 516.

Step 515 occurs just after the automated test system has run the tests in step 502. In this embodiment in step 515 the invention writes the test result which the automated test system just presented to the test results database in order to save it for future diagnosis runs. If this is the first iteration then the test results database will be read to see what bugs are open. This will be compared to the test results which the automated test system just produced and if any of the former bugs have been closed then the test results database will updated with this information. Also, all stored test results related to the failing test-configuration combinations as reported by the automated tests system will be read from the test results database. If this is not the first iteration then all diagnosis conclusions for each test-configuration combination and TRPG will be stored in the test results database.

The rest of the diagnosis works in the same way as earlier described in the embodiment of this invention which does not have a test results database. As much more test results and diagnosis information will be available from start then fewer diagnosis tests will be requested and thus time and computer resources will be saved.

Step 516 occurs after the bugs have been reported in 511. At this point the test results database is updated with the fully conclusive diagnosis report.

Figure 3:
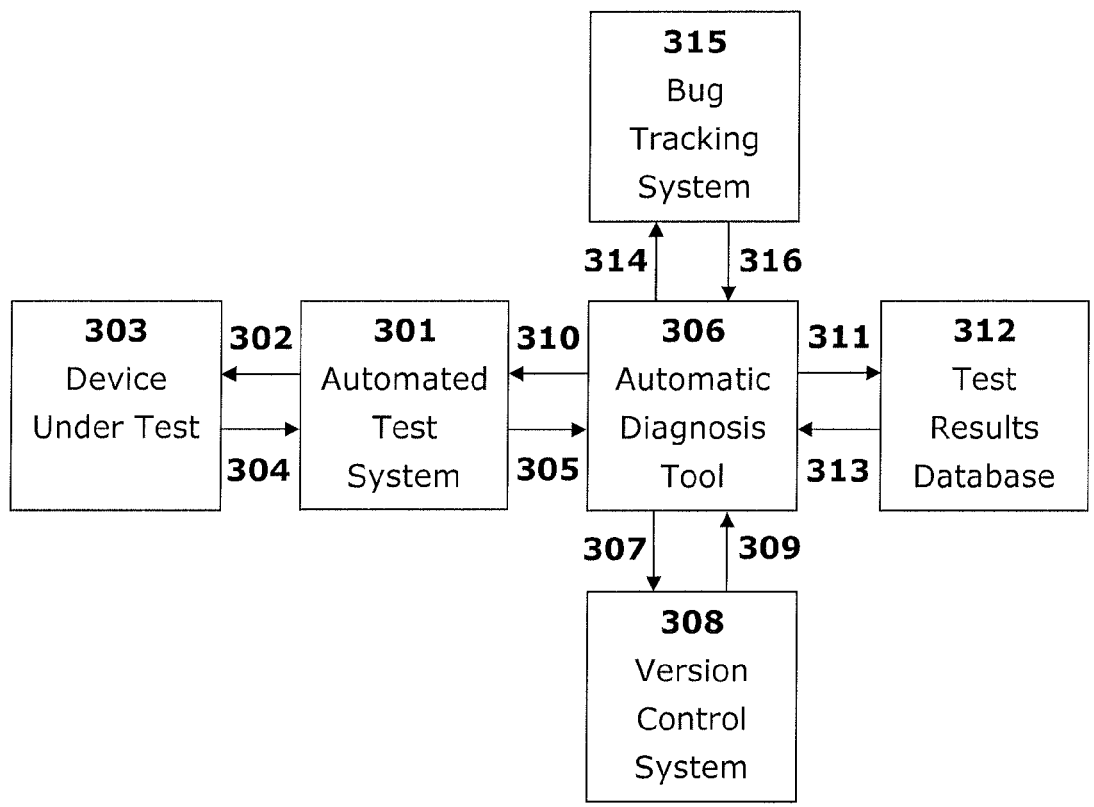
FIG. 3 illustrates a system setup with a test results database and a bug tracking system in accordance with an embodiment of the present invention.

A Method and Apparatus for Automatic Diagnosis of Regression Test Failures with a Test Results Database and a Bug Tracking System Another embodiment of the present invention is to add both a test results database and a bug tracking system. FIG. 3 illustrates a system setup with a test results database 312 and a bug tracking system 315 in accordance with an embodiment of the present invention. The advantage of adding a bug tracking system to this embodiment of the invention is for the invention to be able to automatically file new bug reports and assign them to the appropriate person. Also this embodiment of the invention can verify that bugs have been fixed and write this down in an open bug report and then close the bug report.

The overall design process does not change with this embodiment of the invention but more tasks are added to step 515 and 516 in FIG. 5.

In step 515 in this embodiment of the invention the automatic diagnosis tool will update the bug tracking system accordingly when it finds that bugs have been closed. It will then update the corresponding bug report in the bug tracking system with the information that it has been verified to have been fixed and the close the bug report. The bug number in the bug tracking system is stored in the test results database.

In step 516 in this embodiment of the invention the automatic diagnosis tool will create a new bug report for any new bug that has been discovered and assign it to the person that has checked in the faulty revision. The bug number will be stored in the test results database. Also the invention will update any open bug report and make a note that the bug is still open and with the time of test.

A Method and Apparatus for Automatically Diagnosing the Root Cause of a Test Failure This invention provides a method and apparatus for automatically diagnosing the root cause of regression test failures. This invention is able to conclude the root cause of a test failure by comparing the tested revision of the device under test with another revision of the device for which the same test passes. The invention is also able to present the link between the root cause and the failure message.

The required input data is as follows:
A failing test
The global revision of the device under test for which the test fails. This revision is called the failing revision.
Another global revision of the device for which the same test fails. This revision is called the passing revision.
A failure message containing the information about which variable, state, output signal or similar is set to an incorrect signal The failing revision and the passing revision of the device under test must not be present in a version control system, although it is convenient if they are. If both revisions are present in a version control system then it is easy to conclude what code lines that differ between the failing and passing revisions by comparing the different revisions in the version control system. If the revisions are not present in the version control system then the invention will perform a line per line comparison between all the files that constitutes the device under test. Both methods lead to the same result, which is a list of lines that differ between the two revisions.

Figure 10:
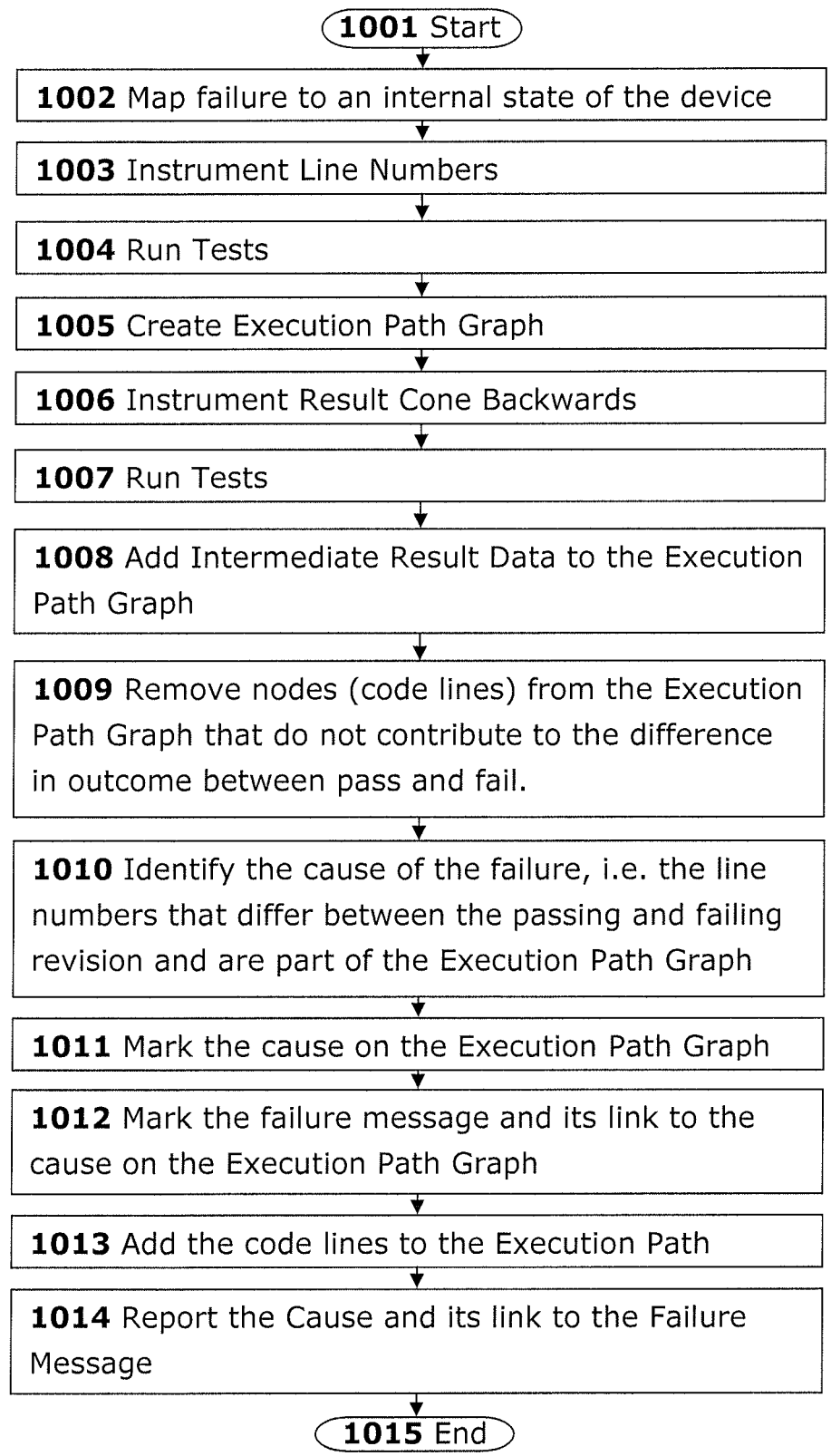
FIG. 10 presents a flow chart of the automatic diagnosis process of finding the root cause of a test failure in accordance with an embodiment of the present invention.

FIG. 10 presents a flow chart of the automatic diagnosis process of finding the root cause of a test failure in accordance with an embodiment of the present invention. The process of finding the root cause for a failing test is started 1001 by an external event such as a user or another program starting the process. The input provided at this stage is the failing revision, passing revision and a failure message.

Figure 11:
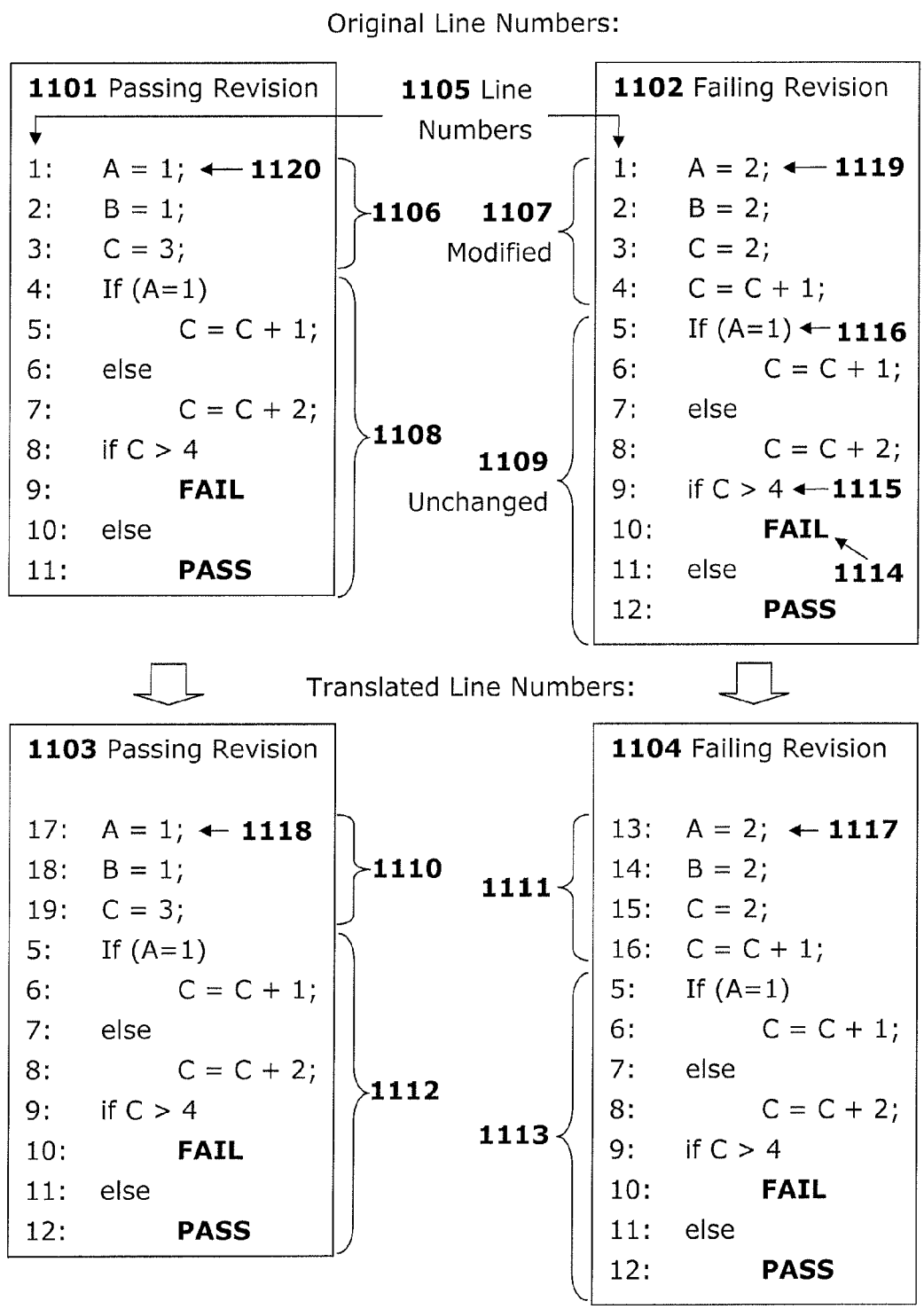
FIG. 11 presents an example of the translation of line numbers for a failing and a passing file revision.

The first step in the diagnosis process 1002 is to map the failure message to an internal state of the device under test, e.g. a value of an internal variable that is incorrect or the value of an output signal that is wrong, and the line number and the file of the device under test where this value is incorrect. The specific embodiment of the invention is able to parse and understand the language of the device for which the embodiment is implemented to manage. If the test environment is written in a different language or environment than the device under test then the test failure message must be translated to a state of the device under test. This scenario requires an embodiment of the invention that understands both the language of the device under test and the language of the test environment and also a model of how to link the two languages for this device under test. In FIG. 11 a failing revision 1102 fails with a failure message on line number 10 (1114) which this invention is able to map to the incorrect internal state of C>4 on line number 9 (1115).

The next step 1003 is to instrument the passing and failing revisions in order to extract the line numbers in order of execution for the passing test and the failing test. Instrumentation is the act of inserting probes into the device under test or the test environment in order to extract data during the execution. The instrumentation is done differently in different programming languages and different test environments, but the principle of these probes is the same. Essentially these probes are small pieces of computer programs or part of computer programs that writes the state of the desired data at regular intervals to a file which can be read by this invention. In same environments these probes are built-in two the test tools which can be interrogated instead of having to insert code into the device under test itself.

In this step 1003 the data that is extracted is the line numbers of the computer programs that are being executed, presented in the order of execution. The instrumentation is done both on the passing revision and the failing revision and then the two revisions are tested again in step 1004. The output of step 1004 is one list of the line numbers in order of execution for the passing revision and another list of the line numbers in order of execution for the failing revision.

Figure 12:
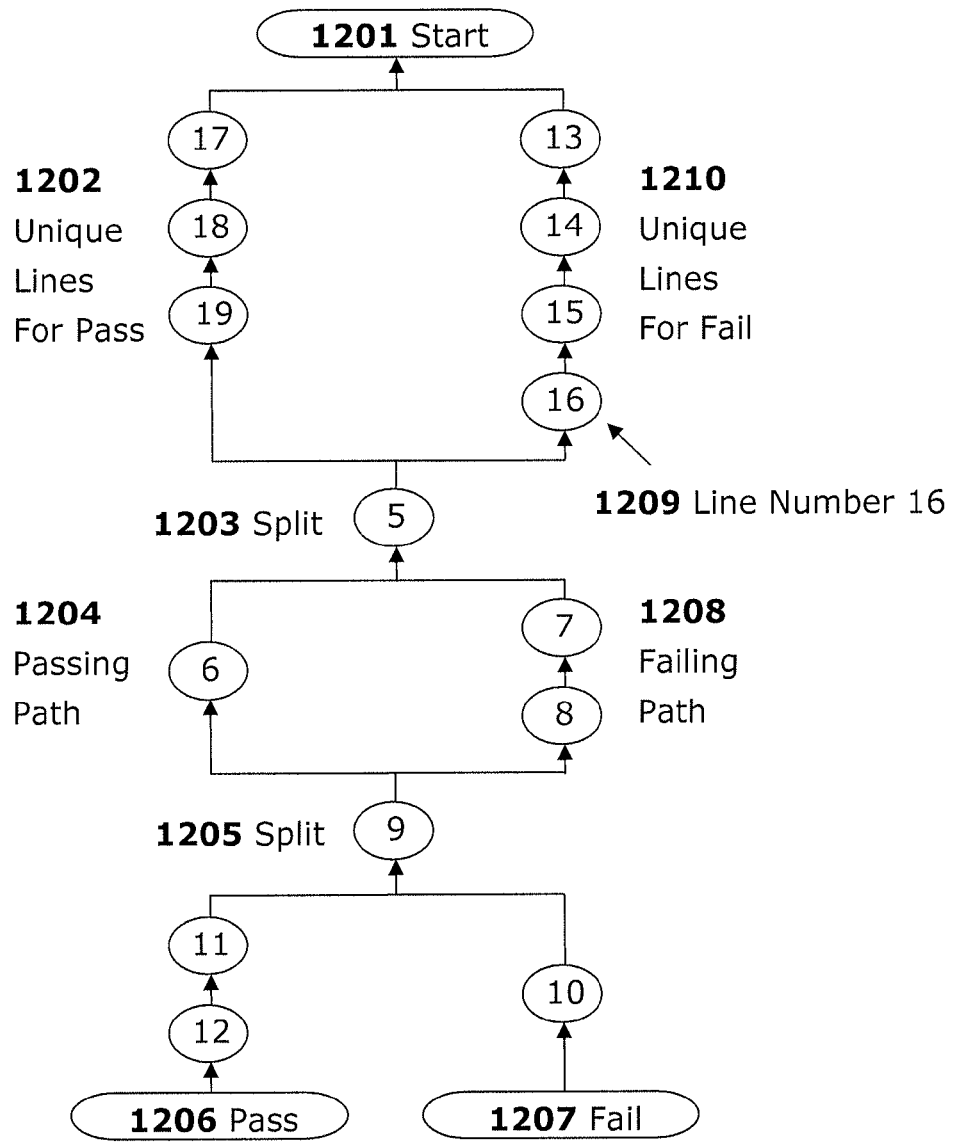
FIG. 12 presents an example of an execution path graph.

In step 1005 the two lists of line numbers in order of execution for the passing and failing revision is transformed into an execution path graph. An execution path graph shows the execution paths for the passing revision and the failing revision. It shows when the paths are the same and when the paths are different. FIG. 12 presents an example of an execution path graph.

The first part of step 1005 is to translate the line numbers of the passing and failing revisions into a common line number list. FIG. 11 presents an example of the translation of line numbers for a failing and a passing file revision. The passing revision 1101 and the failing revision 1102 have different line numbers because the modified part 1107 of the failing revision covers different number of lines numbers than the corresponding part 1106 of the passing revision 1101. The unchanged code section 1109 of the failing revision 1102 and the corresponding section 1108 of the passing revision 1101 are identical, but the line numbering is different. The translation of line numbers is done in such a way that identical sections of the passing and failing revision will have the same line numbers and correspondingly, sections that differ between the two revisions will have different line numbers. In FIG. 11 the line numbers of the failing revision 1102 is translated to the line numbers listed in 1104. The line numbers of the passing revision 1101 are translated into the line numbers listed in 1103. The common sections of code between the translated passing revision 1103 and the translated failing revision 1104 now use the original line numbering from the failing revision 1102. The sections that differ have been given new and different line numbers (refer to 1111 and 1110).

The next part of step 1005 is to create the execution path graph. FIG. 12 presents an example of an execution path graph using the translated line numbering from the same example presented in FIG. 11. The execution graph presents a common starting point 1201 for both the path the test is taking through the passing revision and the path the same test is taking through the failing revision, but as the outcomes are different there are two different end points: one for pass 1206 and one for fail 1207. The number in each node is the translated line number, e.g. 1209 points to line number 16. After the starting point 1201 the execution differs immediately between the passing path and the failing path (refer to 1202 and 1210). The difference in paths at this stage is due to a difference in the two revisions. These are sections in the computer program that are different in the two revisions. At 1203 both the passing and failing paths are joined into a joint path as both execute line number 5. After this point the paths are split again. This time the difference between the passing path 1204 and failing path 1208 is not due to a difference in revisions, as this section of the computer program is the same in both revisions. Instead the difference in the execution paths 1204 and 1208 is due to a difference in the internal state at line number 5 (1203), which caused the split in execution paths between the passing and failing revision. The two paths are joined again at line number 9 (1209), but again split due to a difference in internal state, which leads to the fail and pass message respectively. The execution path graph in FIG. 12 gives an exact understanding of the difference in execution paths between a passing and failing revision.

Figure 13:
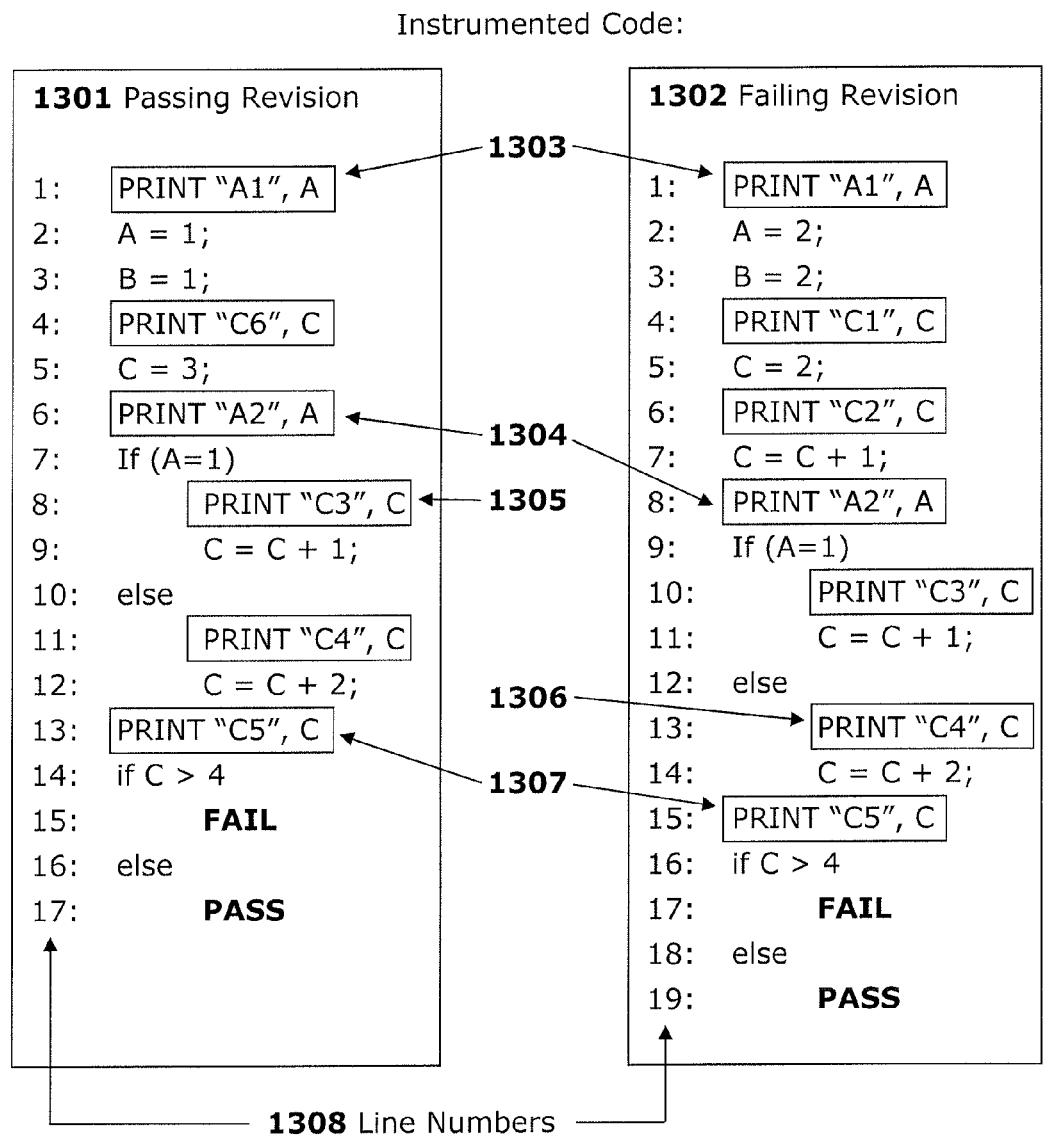
FIG. 13 presents an example of instrumentation of the code in the results cone.

The next step in the diagnosis process is to instrument the result cone backwards 1006. The purpose is to extract the difference in the internal state at critical points in the execution path graph between the failing and the passing revision in order to understand the difference in outcome. Starting in the erroneous internal state (refer to 1115 in FIG. 11) that was translated from the failure message in step 1002 the invention follows the execution path graph backwards up to the starting point and inserts an instrumentation probe by each split (refer to 1203 and 1209) and also each time the erroneous internal state (1115) is updated, in this case variable C. Also instrument all variables whose values affect the outcome of variable C, indirectly via another variable or directly as in this example variable A (1116). All variables that affect the outcome of the erroneous internal state is called the result cone and it must be instrumented backwards in order to catch all variables that affects the outcome of the erroneous internal state. FIG. 13 presents an example of instrumentation of the code in the results cone. The instrumentation in FIG. 13 is represented as print-statements which prints the state of the desired variable states, but the actual implementation of the instrumentation will depend on which programming language the device under test and test environment are implemented in and which tools that are used. The instrumentation of the split 1203 in the execution path graph in FIG. 12 is represented by the instrumentation 1304 in FIG. 13. The instrumentation of the erroneous internal state, i.e. the split at 1205 is represented by the instrumentation 1307. The rest of the instrumentations in FIG. 13 are inserted at all updates of variables C and A.

Figure 14:
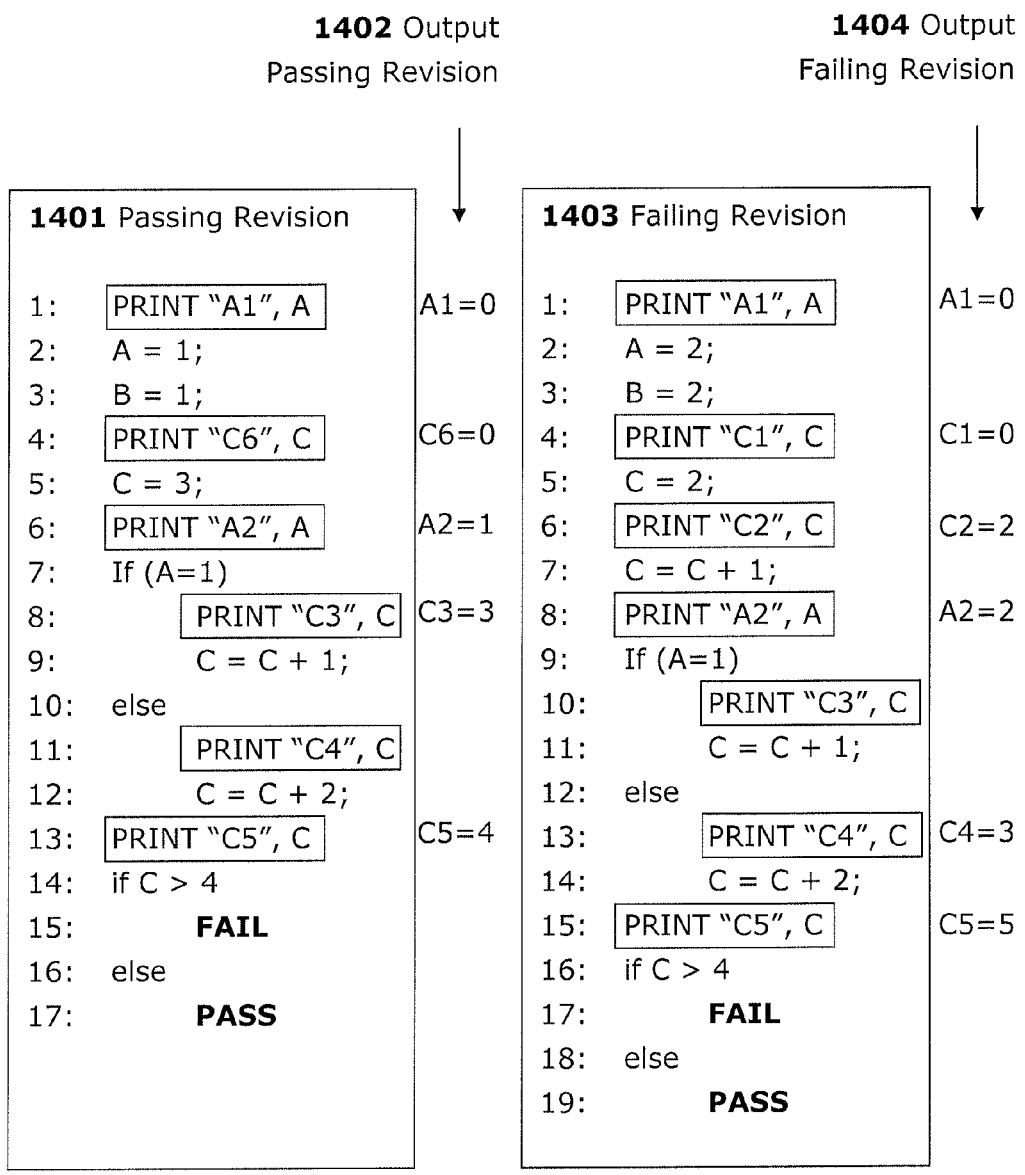
FIG. 14 presents an example of the output of instrumented code.

The next step in the diagnosis process in FIG. 10 is to run the tests on both the passing and the failing revisions again 1007 and catch the outcome of the instrumentation of the result cone. FIG. 14 presents an example of the output of instrumented code, both the output from the passing revision 1402 and the output from the failing revision 1404.

Figure 15:
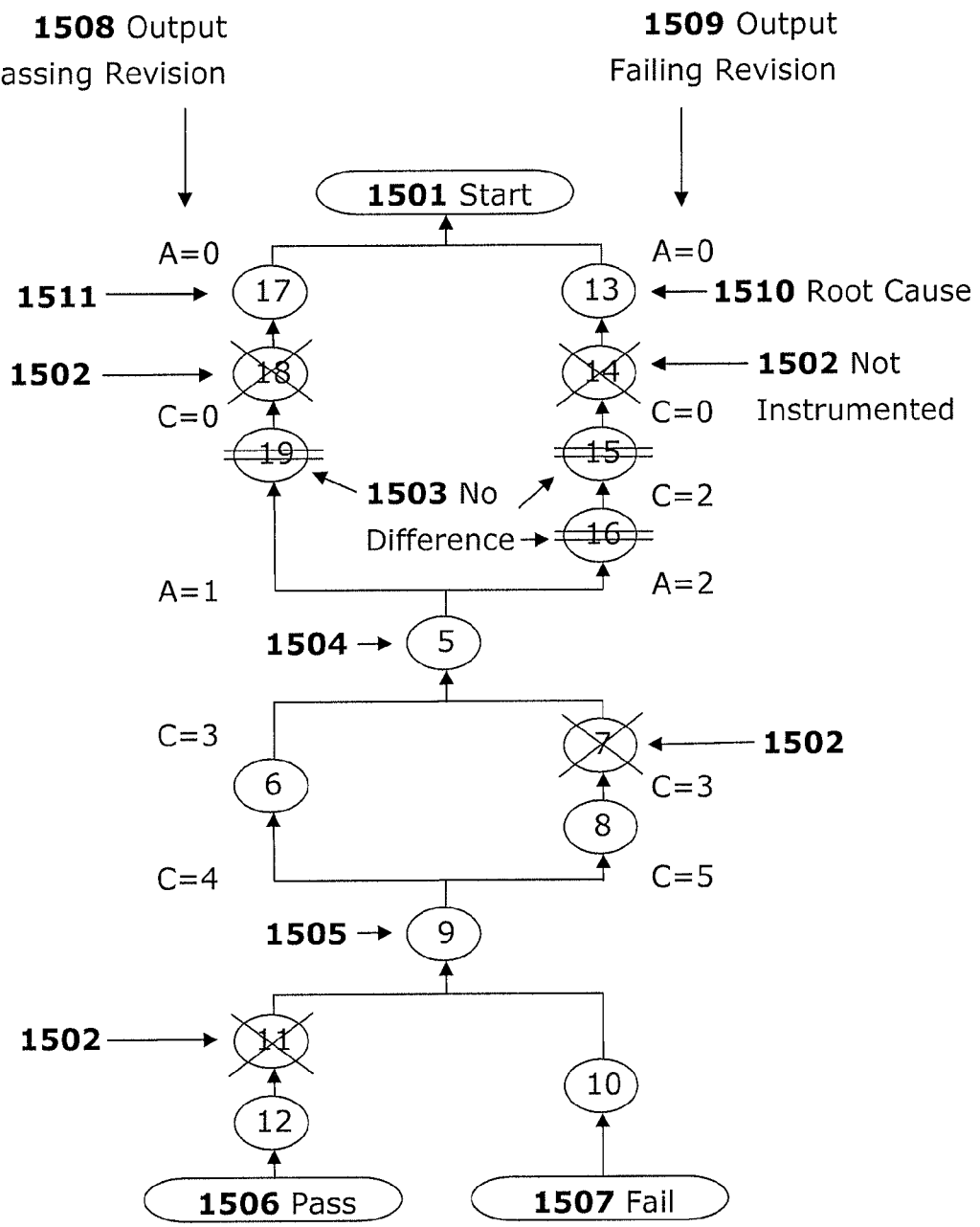
FIG. 15 presents an example of data from the instrumented results cone mapped to an execution path graph.

The next step in the diagnosis process in FIG. 10 is step 1008, which is to add the intermediate result data extracted in step 1007 to the execution path graph. FIG. 15 presents an example of data from the instrumented results cone mapped to an execution path graph. The data extract from the instrumentation is added to both execution paths, 1508 for the passing path and 1509 for the failing path.

Next step in the diagnosis process, step 1009, is to remove nodes, i.e. line numbers, from the execution path graph that do not contribute to the difference in outcome between pass and fail. The nodes that were not instrumented in step 1008 were not instrumented because the corresponding section in the computer program did not affect any variable or execution path decision that could affect the outcome of the erroneous internal state. These nodes 1502 in FIG. 15 can be removed. The second category of nodes that can be removed in step 1009 are the nodes that were instrumented but whose values don't differ, such as 1503. These nodes were instrumented because the corresponding section in the computer program, i.e. the device under test, all updated variable C, which is the variable that ends with an erroneous value when the test is run on the failing revision. However, the instrumentation of the result cone has revealed that at this stage 1504, where the two paths are joined, both paths have the variable C set to the value 3. Thus the nodes at 1503 do not contribute to a difference in the internal state between the two execution paths and are consequently removed in step 1009.

The next step 1010 is to identify the root cause of the test failure. The remaining nodes in FIG. 15 all affect the difference in outcome of the execution path and in the end the erroneous variable value which is the reason for the test failure. However, the root cause must be one or several lines belonging to a section of the computer program, i.e. the device under test, which is different between a passing and failing revision. In the example in FIG. 15 the only node that fulfill this criteria is line number 13 (1510) in the failing revision which corresponds to line number 17 (1511) in the passing revision. Consequently the root cause is line number 13 (1510). In FIG. 11 we can check what this line number contains and map it back to the original line numbers. Line number 13 (1117) contains "A=2;" and its original line number was line number 1 (1119) in the failing revision. Correspondingly for the passing revision, line number 17 (1118)

contains "A=1;" and its original line number was line number 1 (1120) in the passing revision.

Figure 16:
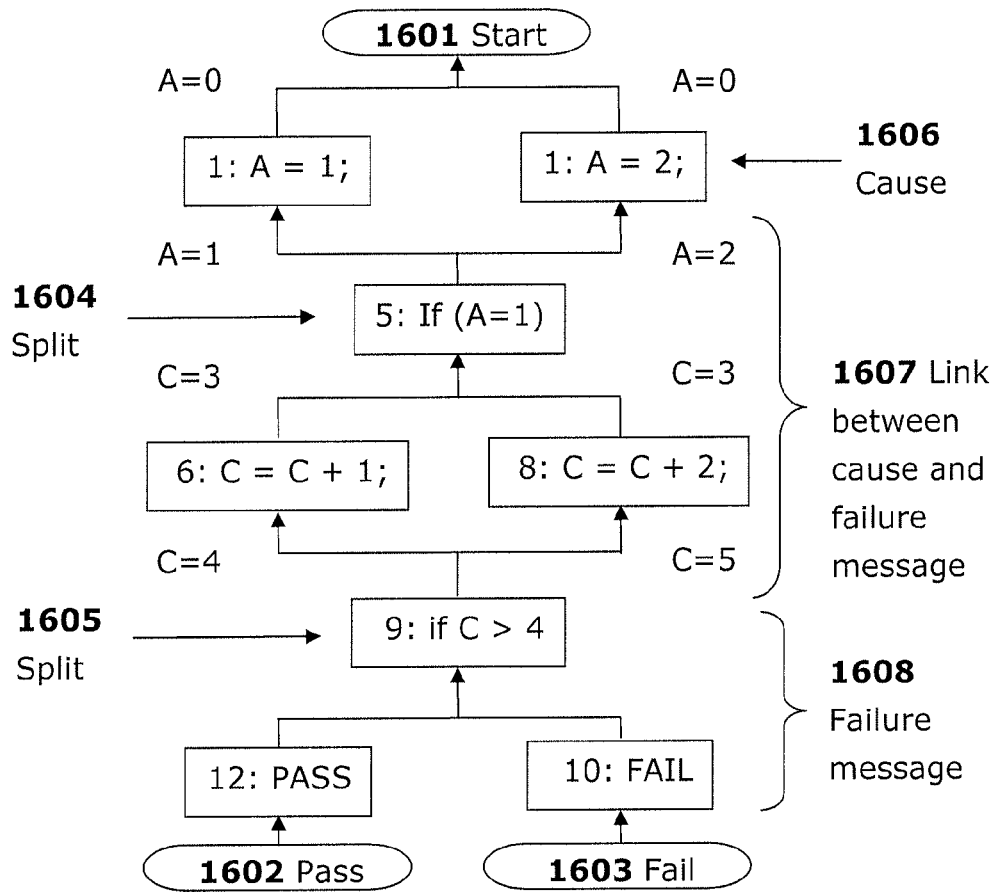
FIG. 16 presents an example of the final result of the automatic root causing.
Figure 17:
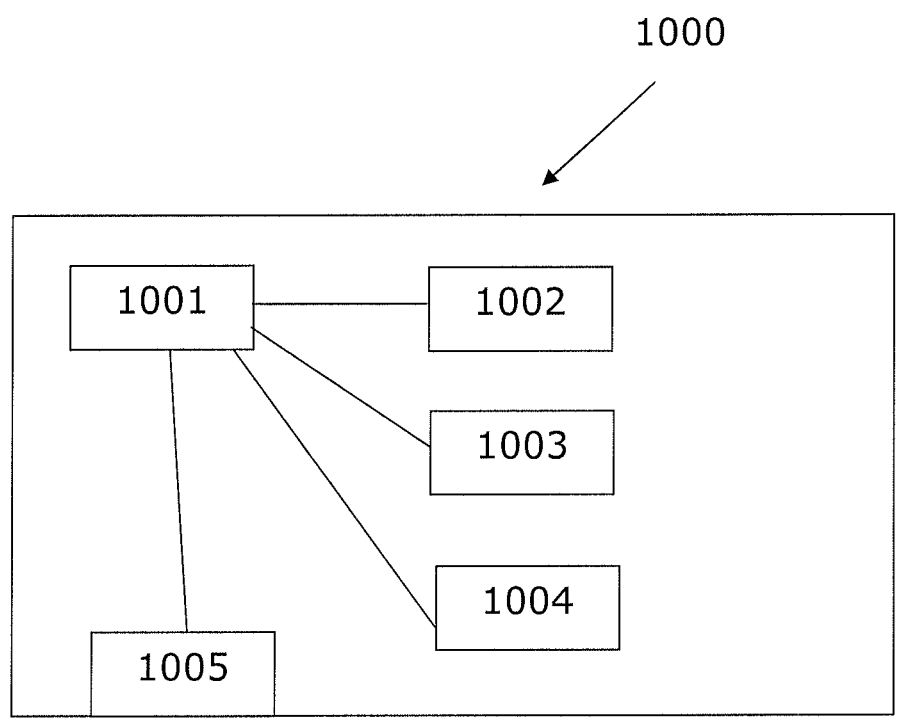
FIG. 17 shows schematically a device according to the present invention.

The next step in the diagnosis process 1011 is to mark the cause on the execution graph, which is done at 1606 in FIG. 16.

The following step in the diagnosis process 1012 is to mark the failure message 1608, including the erroneous internal state 1605, as well as the link to the cause 1607. The link to the cause is simply the execution graph between the cause 1606 and the erroneous internal state 1605.

The next step 1013 in the diagnosis process is to add the code lines and the original line numbers to the execution path graph as has been done in the example in FIG. 16.

The final step 1014 is to report the cause and its link to the failure message. This is done by reporting the version of the execution path graph as it is presented in FIG. 16, which contains all this information. This ends the diagnosis process 1015.

FIG. 10 shows a device 1000 implementing the solution according to the present invention. The device may comprise a computational unit 1001, such as a microprocessor, digital signal processor, FPGA (Field programmable gate array), ASIC (application specific integrated circuit) . . . , a volatile memory unit 1002 (such as RAM memory or suitable type), optionally a non-volatile memory unit 1003 (e.g. a hard disk, Flash disk, ROM, EEPROM or similar), and optionally a communication interface (e.g. an Ethernet interface) 1005. Furthermore, the device may comprise a user interface unit 1004 for handling user interface such as receiving commands using user interface peripheral equipment and displaying results on a display device (not shown).

According to one embodiment, a method for automatic diagnosis of regression test failures is disclosed. The method comprising the steps of:
  receiving a list of test results, per configuration for a revision of the device under test, from an automated regression test system;
  analyzing the list and extracting all failing tests per configuration;
  analyzing the revisions in the version control system and comparing them to the list of test results in order to conclude which additional revisions that needs to be tested per failing test and configuration in order to find the earliest failing revision per failing test and configuration;
  grouping the failing test per configuration into groups where each group of tests per configurations is assumed to be caused by the same faulty revision;
  requesting the automated regression test system to test the necessary revisions for respective failing test and configuration;
  receiving a list of test results, per configuration for all revisions that were requested, from an automated regression test system;
  regrouping the test failures into groups where each group of test failures is assumed to be caused by the same faulty revision. As more test results are available at this stage the grouping may become different, i.e. more correct;
  controlling whether the earliest failing revision can be concluded for each failing test per configuration. If not then the go back to the previous step where the missing revisions per test and configuration are requested from the automated regression test system;
  reporting each faulty revision and the group of tests per configurations that fail as a consequence;
  updating at least one memory unit area with the diagnosis report.

The test results may also come from a test results database containing the test results and the diagnosis conclusions from previous runs. The updating occurs not only to a memory area but also the test results database is updated.

The updating may also involve automatic creation of one bug report per new group of failing tests and configurations that fail due to the same faulty revision. Also, open bug reports may automatically be updated with information about whether the bug is still open, and if not then the bug report is also automatically closed.

According to one embodiment, a method for fast automatic diagnosis of regression test failures when handling groups of failing tests and configurations is disclosed. The method comprises:
  receiving a list of test results, per configuration for a revision of the device under test, from an automated regression test system;
  analyzing the list and extracting all failing tests per configuration;
  analyzing the revisions in the version control system and comparing them to the list of test results in order to conclude which additional revisions that needs to be tested per failing test and configuration in order to find the earliest failing revision per failing test and configuration;
  grouping the failing test per configuration into groups where each group of tests per configurations is assumed to be caused by the same faulty revision;
  picking the test and configuration within the group that takes least time to diagnose and request the automated regression test system to test one such test for one configuration per group;
  requesting the automated regression test system to test the necessary revisions for respective failing test and configuration;
  receiving a list of test results, per configuration for all revisions that were requested, from an automated regression test system;
  regrouping the test failures into groups where each group of test failures is assumed to be caused by the same faulty revision. As more test results are available at this stage the grouping may become different, i.e. more correct;
  controlling whether the earliest failing revision can be concluded for each selected test and configuration combination per group. If not then the go back to the previous step where the missing revisions per test and configuration are requested from the automated regression test system;
  selecting the earliest failing revision and the last passing revision of the tested test and configuration combinations and request the automated regression test system to only run these two revisions on the other combinations of tests and configurations within the same group;
  receiving a list of test results, per configuration for all revisions that were requested, from an automated regression test system;
  regrouping the test failures into groups where each group of test failures is assumed to be caused by the same faulty revision. As more test results are available at this stage the grouping may become different, i.e. more correct;
  controlling whether the earliest failing revision can be concluded for each selected test and configuration combination per group. If not then the go back to the previous step where the missing revisions per test and configuration are requested from the automated regression test system;

reporting each faulty revision and the group of tests per configurations that fail as a consequence;

updating at least one memory unit area with the diagnosis report.

According to one embodiment, a method for automatically diagnosing the root cause of a test failure is disclosed. The method comprises:

receiving a test, a failure message and the two revisions of a test which fails on one revision of the device under test and passes one another revision of the same device;

mapping the failure message to an incorrect internal state of the device under test and the line number at which the incorrect internal state is achieved. The line number refers to the computer program that constitutes the device under test;

instrumenting the two revisions in order to extract the line number execution order of the computer program that constitutes the device under test;

running the test on both revisions in order to extract the line number execution orders;

creating a graph which presents the two different execution paths through two different revisions;

instrumenting the two revisions in order extracting the state of all variables that affects, directly or indirectly, the final erroneous internal state or the decision points where the paths of the failing and passing test go different ways;

running the test on both revisions again in order to extract the instrumented variable values;

removing all line numbers in the graph which do not affect the final erroneous internal state or the difference in execution paths between the passing and failing test. This includes line numbers that were not instrumented for variable states as these lines do not contain any settings of variables that affect any difference in outcome. This also includes line numbers that were instrumented for variable states, but where the data sampled in the subsequent run showed that there is no difference in the instrumented variable data at the next common line number, which is executed by both the passing and failing test;

identifying the root cause, by extracting all remaining line numbers in the graph which differ in the revision that passes the test and the revision that fails the test. These lines in the failing revision are the root cause of the test failure;

report the root cause and the graph which shows the link between the root cause and the internal erroneous state. Also present the link between the internal erroneous state and the failure message;

update at least one memory unit area with the result.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method at an automatic diagnosis tool for automatic diagnosis of test failures for a device under test, the method comprising:

receiving, from an automated test system, first test results for a plurality of tests performed on a set of revisions of the device under test, the first test results indicating for each revision of said set of revisions whether each of the tests failed or passed for said revision;

on a condition that at least two tests of the plurality of tests failed for a latest revision, selecting one pilot test, wherein the pilot test is a failing test that is, from among a plurality of failing tests that the first test results indicate were failed by the latest revision, that is fastest to perform;

determining, for each test of the plurality of tests, one or more untested revisions of the device under test for which the test has not been run, wherein for at least one of said tests, there is at least one untested revision of the device under test;

requesting, from the automated test system, second test results for the pilot test for each untested revision of the one or more untested revisions of the device under test;

receiving, from the automated test system, the second test results for the pilot test of the one or more untested revisions;

identifying, using the second test results, a first revision of said set of revisions for which said pilot test passed and which is earlier than said latest revision and being such that said pilot test failed for each revision of said set of revisions being later than the first revision; and requesting the automated test system to run, on the first revision and on a next revision immediately following the first revision, all tests in the plurality of tests other than the pilot test that have not been previously run on the first revision or the next revision, respectively;

receiving from the automated test system third test results for said all tests in the plurality of tests other than the pilot test that have not been previously run on the first revision or the next revision;

identifying, using the third test results, a list of tests comprising tests that passed on the first revision and that failed on the next revision;

providing a report indicating the next revision and said list of the tests; and reading from a version control system storing the revisions of the device under test and obtaining data regarding the next revision, said data comprising information about at least one of in the group of: committer of the revision, commit date of the revision, updated file versions, and updated computer program lines in the file versions.

2. The method according to claim 1, wherein the first test results, second test results, and third test results are also coming from a test results database containing the test results and the diagnosis conclusions from previous tests performed on a set of revisions of the device under test.

3. The method according to any one of claims 1-2, further comprising:

providing in the report additional content containing said data regarding the next revision; and automatically creating bug reports based on the information in the report.

* * * * *